UNITED STATES PATENT OFFICE.

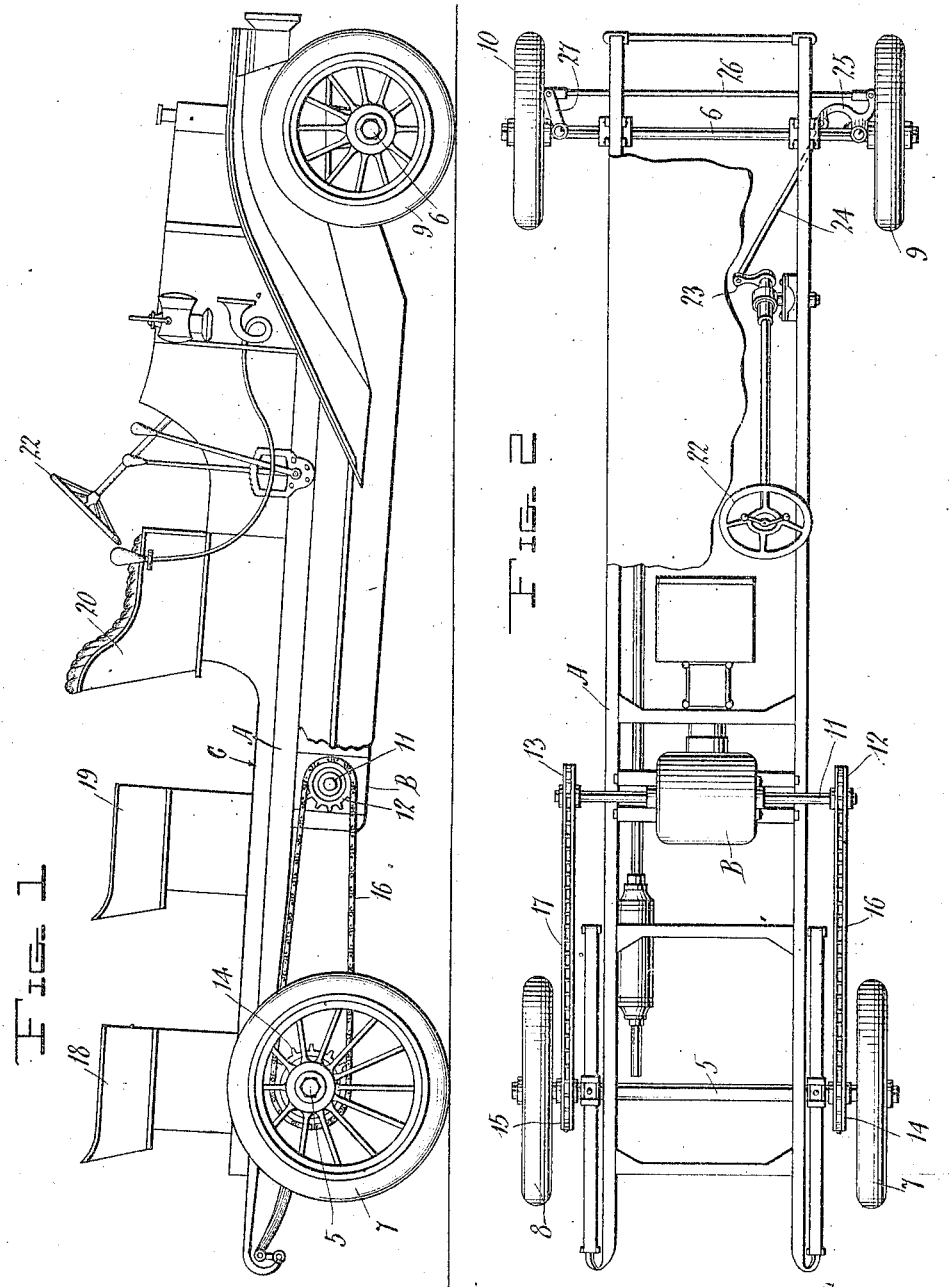

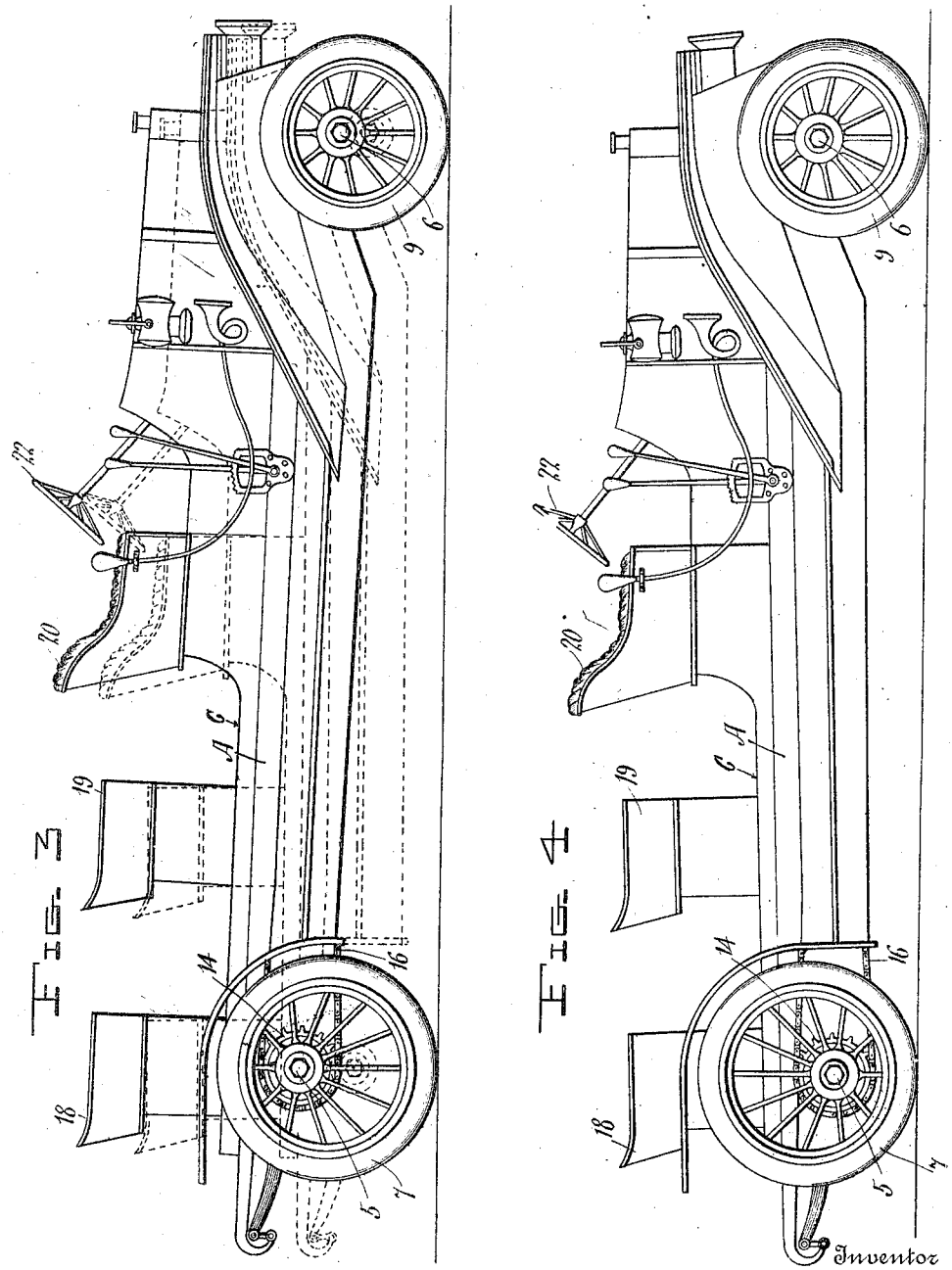

EDWARD W. DESENFANTS, OF CHICAGO, ILLINOIS, ASSIGNOR OF ONE-HALF TO CHARLES E. DESENFANTS, OF CHICAGO, ILLINOIS.

BUCKING AUTOMOBILE.

1,039,035.

Specification of Letters Patent.

Patented Sept. 17, 1912.

Application filed December 9, 1909. Serial No. 532,184.

*To all whom it may concern:*

Be it known that I, EDWARD W. DESENFANTS, a citizen of the United States, residing at Chicago, in the county of Cook, State of Illinois, have invented certain new and useful Improvements in Bucking Automobiles; and I do hereby declare the following to be a full, clear, and exact description of the invention, such as will enable others skilled in the art to which it appertains to make and use the same.

This invention relates to amusement devices and particularly to those of the vehicle type.

The object of the invention resides in the production of a self propelled vehicle which when in motion will impart to the occupants a variety of exhilarating and highly amusing sensations due to the peculiar movements imparted to the body of the vehicle during travel.

To this end the invention consists in the details of construction and in the arrangement and combination of parts to be herein more fully described and set forth in the claims.

In describing the invention in detail reference will be had to the accompanying drawings in which like characters of reference indicate corresponding parts in the several views and in which, Figure 1 is a side elevation of a vehicle constructed in accordance with the invention; Fig. 2, a top plan view of same with a portion of the body of the vehicle removed showing the mechanism for propelling same and the steering gear; Fig. 3, a view similar to Fig. 1 showing one of the positions assumed by the body of the vehicle during travel; and, Fig. 4, a similar view showing still another position assumed by the body of the vehicle.

Referring to the drawings 5 and 6 indicate respectively the rear and front axles of the vehicle. The rear axle 5 has eccentrically fixed thereon the wheels 7 and 8, while the axle 6 is likewise provided with the eccentrically journaled wheels 9 and 10 which are of a less diameter than those journaled on the rear axle. Suspended on the axles 5 and 6 is a body supporting frame A. Carried by the frame A is a motor B of the gasolene engine type, and the drive shaft 11 of said motor extends transversely of the frame A and has secured thereon the sprocket wheels 12 and 13. Mounted on the axle 5 are the sprocket wheels 14 and 15 and a sprocket chain 16 connects the wheels 12 and 14 while a similar chain 17 connects the wheels 13 and 15, whereby the actuation of the motor B will rotate the axle 5 and propel the vehicle. Supported upon the frame A is the body of the vehicle C which is provided with the seats 18, 19 and 20. Located in front of the seat 20 is the operating wheel 22, the rotation of which effects the steering of the vehicle through the medium of the connections 23, 24, 25, 26, and 27 in a usual and well known manner.

Owing to the eccentric journaling of the wheels 7 8, 9 and 10 a series of constantly varying and amusing motions will be imparted to the vehicle and by reason of the fact that the wheels 9 and 10 are loosely mounted upon the axle 6, and are of less diameter than the wheels 7 and 8 each successive motion of the body C of the vehicle will be different from the preceding one, which will tend to keep the occupants in a state of excitement and expectancy during the progress of the vehicle. It will also be noted that owing to the fact that the wheels 9 and 10 are loosely mounted upon the axle 6 they will not rotate correspondingly and this will cause the forward portion of the vehicle body to partake of a side tilt or dip as the short radius of one wheel will at times be disposed beneath the axle while the long radius of the other wheel will be at the same time disposed beneath the other end of the axle.

What is claimed is:—

1. A vehicle comprising front and rear axles, a body supported by said axles, and wheels mounted on the end of each of said axles with their peripheries disposed eccentric to their axis of rotation, the wheels on said front axles being independently revoluble with respect to each other.

2. A vehicle comprising front and rear axles, a body supported by said axles, and wheels mounted on the ends of each of said axles with their peripheries disposed eccentric to their axis of rotation, the wheels on said front axles being independently revoluble with respect to each other and of different diameters than the wheels on the rear axles.

In testimony whereof, I affix my signature, in presence of two witnesses.

EDWARD W. DESENFANTS.

Witnesses:
 EDW. S. SCHREIBER,
 JOHN SMITH.